(12) United States Patent
Yang et al.

(10) Patent No.: US 11,405,788 B2
(45) Date of Patent: Aug. 2, 2022

(54) WIRELESS NETWORK SERVICE ACCESS CONTROL WITH SUBSCRIBER IDENTITY PROTECTION

(71) Applicant: Apple Inc., Cupertino, CA (US)

(72) Inventors: Xiangying Yang, Cupertino, CA (US); Lijia Zhang, Beijing (CN); Huarui Liang, Beijing (CN); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/052,163

(22) PCT Filed: May 2, 2018

(86) PCT No.: PCT/CN2018/085320
§ 371 (c)(1),
(2) Date: Oct. 30, 2020

(87) PCT Pub. No.: WO2019/210461
PCT Pub. Date: Nov. 7, 2019

(65) Prior Publication Data
US 2021/0058774 A1 Feb. 25, 2021

(51) Int. Cl.
*H04W 12/37* (2021.01)
*H04W 12/72* (2021.01)
(Continued)

(52) U.S. Cl.
CPC ......... *H04W 12/37* (2021.01); *H04W 12/086* (2021.01); *H04W 12/72* (2021.01); *H04W 88/02* (2013.01)

(58) Field of Classification Search
CPC ... H04W 12/37; H04W 12/086; H04W 12/72; H04W 88/02
See application file for complete search history.

(56) References Cited

U.S. PATENT DOCUMENTS

2018/0083793 A1 3/2018 Kim et al.

FOREIGN PATENT DOCUMENTS

| CN | 107949048 A | 4/2018 |
|---|---|---|
| CN | 107682880 A | 9/2018 |

OTHER PUBLICATIONS

GSM Association, iUICC POC Group Primary Platform Requirements, Approved Release Version 1.0, May 17, 2017. (Year: 2017).*
(Continued)

*Primary Examiner* — Erica Navar
(74) *Attorney, Agent, or Firm* — Dickinson Wright RLLP (57) ABSTRACT

A device level lock policy, which applies to all smart secure platform (SSP) applications of a mobile device, is used to determine whether a particular SSP application can be activated. A tamper resistant hardware secure element (SE) includes a primary platform with a low level operating system (OS) and one or more SSP applications within one or more secondary platform bundles that include secondary platforms with high level OSs specific to the secondary platform bundles. The low level OS enforces the device level lock policy for all secondary platform bundles by verifying whether a lock policy for the SSP application is consistent with the device level lock policy. When verification succeeds, activation is allowed, and when verification fails, activation is disallowed. Subscription identifiers are not provided in unencrypted form to processing circuitry of the mobile device external to the tamper resistant hardware SE to provide subscriber identity privacy protection.

20 Claims, 9 Drawing Sheets

(51) Int. Cl.
*H04W 12/086* (2021.01)
*H04W 88/02* (2009.01)

(56) References Cited

OTHER PUBLICATIONS

PCT Patent Application No. PCT/CN2018/085320—International Search Report and the Written Opinion dated Dec. 28, 2018.

* cited by examiner

WIRELESS NETWORK SERVICE ACCESS CONTROL WITH SUBSCRIBER IDENTITY PROTECTION

CROSS-REFERENCE TO RELATED APPLICATIONS

The present application is a National Phase filing of PCT/CN2018/085320, entitled "WIRELESS NETWORK SERVICE ACCESS CONTROL WITH SUBSCRIBER IDENTITY PROTECTION," filed May 2, 2018, the content of which is incorporated herein by reference in its entirety for all purposes.

FIELD

The described embodiments set forth techniques for controlling access to wireless network services while also protecting subscriber identity.

BACKGROUND

Many wireless devices are configured to use Universal Integrated Circuit Cards (UICCs) that enable the wireless devices to access wireless services provided by Mobile Network Operators (MNOs). In particular, a UICC includes at least a microprocessor and a read-only memory (ROM), where the ROM is configured to store an MNO profile that the wireless device can use to register and interact with an MNO to obtain wireless services via a cellular wireless network. Typically, a UICC takes the form of a small removable card, (commonly referred to as a Subscriber Identity Module (SIM) card), which is configured to be inserted into a UICC-receiving bay included in a wireless device. In more recent implementations, UICCs are being embedded directly into system boards of wireless devices. These embedded UICCs (eUICCs) can provide several advantages over traditional, removable UICCs. For example, some eUICCs include a rewritable memory that can facilitate installation, modification, and/or deletion of one or more electronic SIMs (eSIMs), which can provide for access to new and/or different services and/or updates for accessing extended features provided by MNOs. An eUICC can store a number of MNO profiles—also referred to herein as eSIMs—and can eliminate the need to include UICC-receiving bays in wireless devices.

An MNO profile includes a globally unique subscription permanent identifier (SUPI), such as an International Mobile Subscriber Identity (IMSI), by which a user that subscribes to wireless services provided by the MNO can be identified uniquely by cellular wireless networks. The SUPI includes a mobile country code (MCC), a mobile network code (MNC), and a unique Mobile Subscriber Identification Number (MSIN). Encryption of the SUPI to form a subscription concealed identifier (SUCI) can be used to mitigate snooping and protect a subscriber's identity. Wireless service providers can also use a lock mechanism to restrict a mobile device, such as a user equipment (UE), to be able to only access wireless network services associated with a particular SIM and/or eSIM based on identifiers of a SUPI. When the SUPI of a mobile device is encrypted to protect a subscription identity, lock mechanisms used to restrict wireless network access based on the SUPI may require updating.

SUMMARY

Representative embodiments set forth techniques for lock mechanisms to restrict access to network services for a mobile device, e.g., a user equipment (UE), while also protecting subscriber identity by encrypting all or a portion of a subscription permanent identifier (SUPI). When a tamper resistant hardware secure element (SE), such as a UICC or an eUICC, encrypts the SUPI, a portion of the SUPI used for enforcement of a device level lock policy can be provided to processing circuitry external to the UICC/eUICC/SE, where the lock mechanism is performed by the processing circuitry external to the UICC/eUICC/SE. The mobile country code (MCC) and mobile network code (MNC) of a SUPI associated with a SIM/eSIM/profile can be provided to the processing circuitry external to the UICC/eUICC/SE by communicating the MCC/MNC as part of a false SUPI, e.g., using an all zeroes field value for the MSIN portion of the false SUPI and the actual MCC/MNC values of the SUPI for the false SUPI. In some embodiments, the MCC and MCC of the SIM/eSIM/profile can be stored as separate elementary files (EFs) that are accessible by the processing circuitry external to the UICC/eUICC/SE. Additional information, such as group identifiers (GIDs), can also be used to determine a level of access permitted for the UE based on the GIDs of an associated SIM/eSIM/profile.

When the UICC/eUICC/SE is used to enforce a lock policy, the entire SUPI including the MCC/MNC and the MSIN can be accessible to the UICC/eUICC/SE. A device level lock policy, which can apply to all SIMs/eSIMs of the UE, can be used by an operating system (OS) of the UICC/eUICC/SE to determine whether particular SIMs/eSIMs can be enabled for use. In some embodiments, a tamper resistant hardware SE of the UE can include a primary platform with a low level operating system and one or more secondary platform bundles provided by service providers. A secondary platform bundle can include one or more smart secure platform (SSP) applications, which can correspond to SIMs/eSIMs/profiles for UICCs/eUICCs. The secondary platform bundle can also include a secondary platform that provides a high level operating system specific to the secondary platform bundle and separate from the low level operating system used for the entire tamper resistant hardware SE. The low level operating system enforces a device level lock policy for all secondary platform bundles. In some embodiments, when performing a management operation for an SSP application, such as when loading a secondary platform bundle on the tamper resistant hardware SE or when activating an SSP application of a secondary platform bundle on the tamper resistant hardware SE, the low level operating system of the primary platform can determine whether an SSP application level lock policy of the high level operating system of the secondary platform bundle is consistent with the device level lock policy of the low level operating system for the UE. When the high level OS lock policy is consistent with the low level OS device level lock policy, the management operation may be performed, such as loading the secondary platform bundle and/or activating an SSP application on the tamper resistant hardware SE. When the high level OS lock policy for the SSP application is inconsistent with the low level OS device level lock policy, the management operation can be disallowed, e.g., the secondary platform bundle can be not loaded or disabled from use on the tamper resistant hardware SE. The low level OS (device) and high level OS (SSP application) lock policies can be used in combination to determine whether certain management operations for SSP applications (or equivalently for eSIMs of an eUICC or SIM of a UICC) can be performed, such as when activating an SSP application for the UE to access cellular wireless services.

The SUPI can encrypted within the tamper resistant hardware SE and not available to processing circuitry external to the tamper resistant hardware SE.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that some UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative embodiments set forth techniques for enforcement of lock mechanisms to restrict access to network services for a mobile device, e.g., a user equipment (UE), while also protecting subscriber identity by encrypting all or a portion of a subscription permanent identifier (SUPI). A device level lock mechanism for the UE can limit cellular wireless network access based on a lock policy applicable to the UE as a whole. In some embodiments, processing circuitry external to a tamper resistant hardware secure element (SE), such as a UICC or eUICC, or an equivalent thereof, can provide enforcement for the lock policy based on network information included in a subscription identity, such as in a subscription permanent identifier (SUPI), an example of which is an international mobile subscriber identity (IMSI). In particular, the mobile country code (MCC) and mobile network code (MNC) of the SUPI/IMSI of a SIM/eSIM/profile can be used to determine whether the SIM/eSIM/profile can be enabled and/or used by the UE based on checking the MCC/MNC against the device level lock policy of the UE. In some embodiments, the processing circuitry external to the tamper resistant hardware SE can be restricted from accessing the unencrypted SUPI of the SIM/eSIM/profile. In some embodiments, the MCC/MNC of the SUPI can be accessed by the processing circuitry external to the tamper resistant hardware SE, which can provide the values of the MCC/MNC of the SUN/IMSI alone or as part of a false SUN/IMSI to the processing circuitry. In some embodiments, the false SUN/IMSI includes a dummy value, such as an all zeroes value, for a subscriber identity portion of the false SUN/IMSI, e.g., for the MSIN portion of an IMSI. In some embodiments, the tamper resistant hardware SE can maintain the MCC/MNC as separate elementary fields that are readable by the processing circuitry external to the tamper resistant hardware SE. In some embodiments, the processing circuitry external to the tamper resistant hardware SE accesses additional information from the tamper resistant hardware SE to enforce the lock policy for the UE, where the additional information is not encrypted by the tamper resistant hardware SE. For example, one or more group identifiers (GIDs) can be used in combination with the MCC/MNC to determine whether a SIM/eSIM/profile can be used with the UE based on the lock policy for the UE.

In some embodiments, enforcement of the lock policy is performed on the tamper resistant hardware SE rather than on the processing circuitry external to the tamper resistant hardware SE. In some embodiments, an original equipment manufacturer (OEM) of the UE can determine on which hardware components of the UE the lock policy can be enforced. When the lock policy is performed within the tamper resistant hardware SE, preferably, the tamper resistant hardware SE is not removable from the UE, e.g., soldered in as with an eUICC.

These and other embodiments are discussed below with reference to FIGS. 1 through 7; however, those skilled in the art will readily appreciate that the detailed description given herein with respect to these figures is for explanatory purposes only and should not be construed as limiting.

Figure 1:
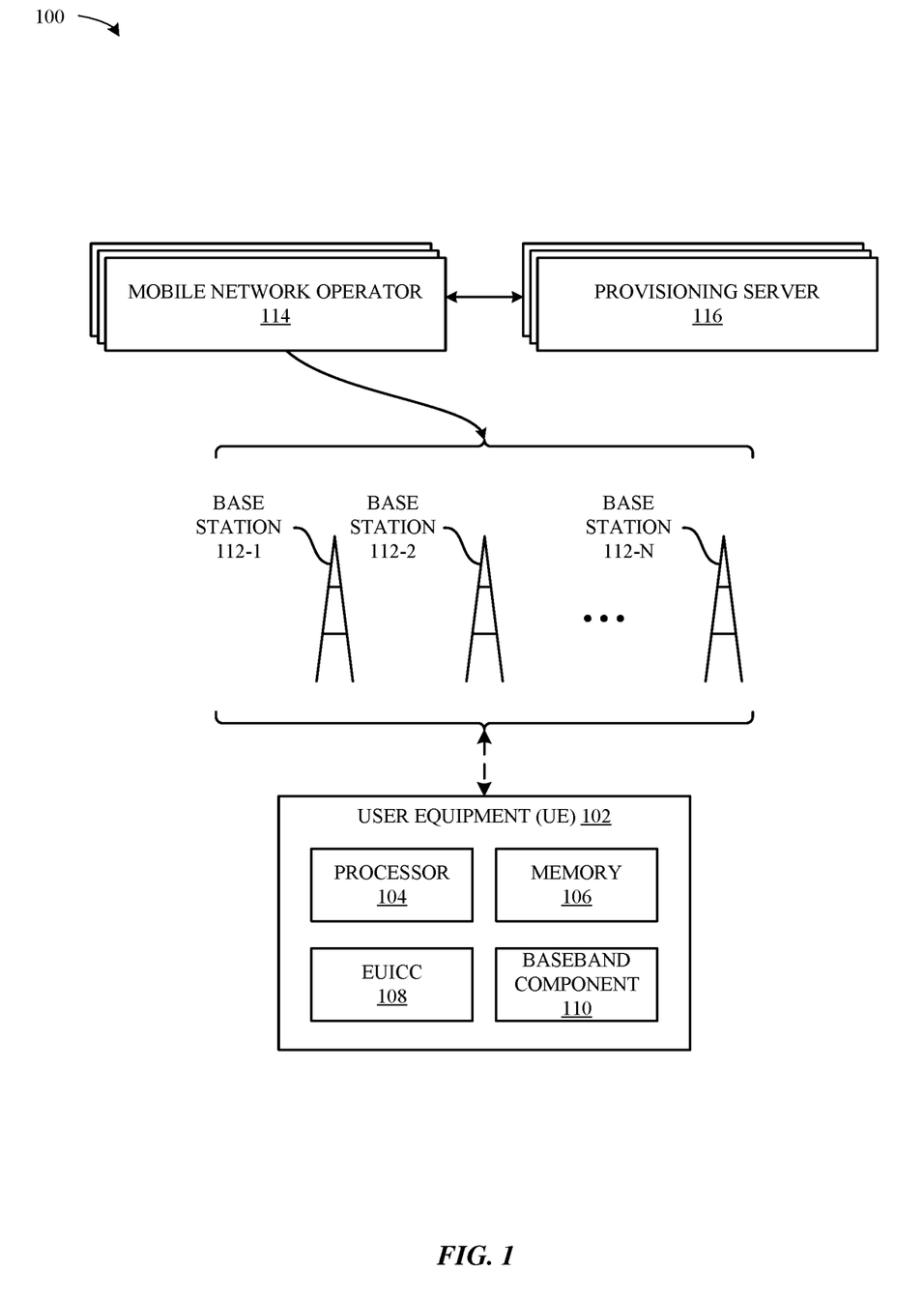
FIG. 1 illustrates a block diagram of different components of an exemplary system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a user equipment (UE) 102, a group of base stations 112-1 to 112-*n* that are managed by different Mobile Network Operators (MNOs) 114, and a set of provisioning servers 116 that are in communication with the MNOs 114. The UE 102 can represent a mobile computing device (e.g., an iPhone® or an iPad® by Apple®), the base stations 112-1 to 112-*n* can represent cellular wireless network entities including evolved NodeBs (eNodeBs or eNBs) and/or next generation NodeBs (gNodeBs or gNB) that are configured to communicate with the UE 102, and the MNOs 114 can represent different wireless service providers that provide specific services (e.g., voice and data) to which the UE 102 can be subscribed.

As shown in FIG. 1, the UE 102 can include processing circuitry, which can include a processor 104 and a memory 106, an embedded Universal Integrated Circuit Card (eUICC) 108, and a baseband component 110. In some embodiments, the UE 102 includes one or more physical Subscriber Identity Module (SIM) cards (not shown) in addition to or substituting for the eUICC. The components of the UE 102 work in conjunction to enable the UE 102 to provide useful features to a user of the UE 102, such as localized computing, location based services, and Internet connectivity. The eUICC 108 can be configured to store multiple electronic SIMs (eSIMs) for accessing different MNOs 114 through the base stations 112-1 to 112-*n*. For example, the eUICC 108 can be configured to store and manage one or more eSIMs for one or more MNOs 114 for different subscriptions to which the UE 102 is associated. To be able to access services provided by the MNOs, an eSIM can be provisioned to the eUICC 108. In some embodiments, the eUICC 108 obtains one or more eSIMs (or updates for one or more eSIMs) from one or more associated provisioning servers 116. It is noted that provisioning servers 116 can be maintained by a manufacturer of the UE 102, the MNOs 114, third party entities, and the like. Communication of eSIM data between a provisioning server 116 and the eUICC 108 (or between the provisioning server 116 and processing circuitry of the UE 102 external to the eUICC 108, e.g., the processor 104) can use a secure communication channel.

Figure 2A:
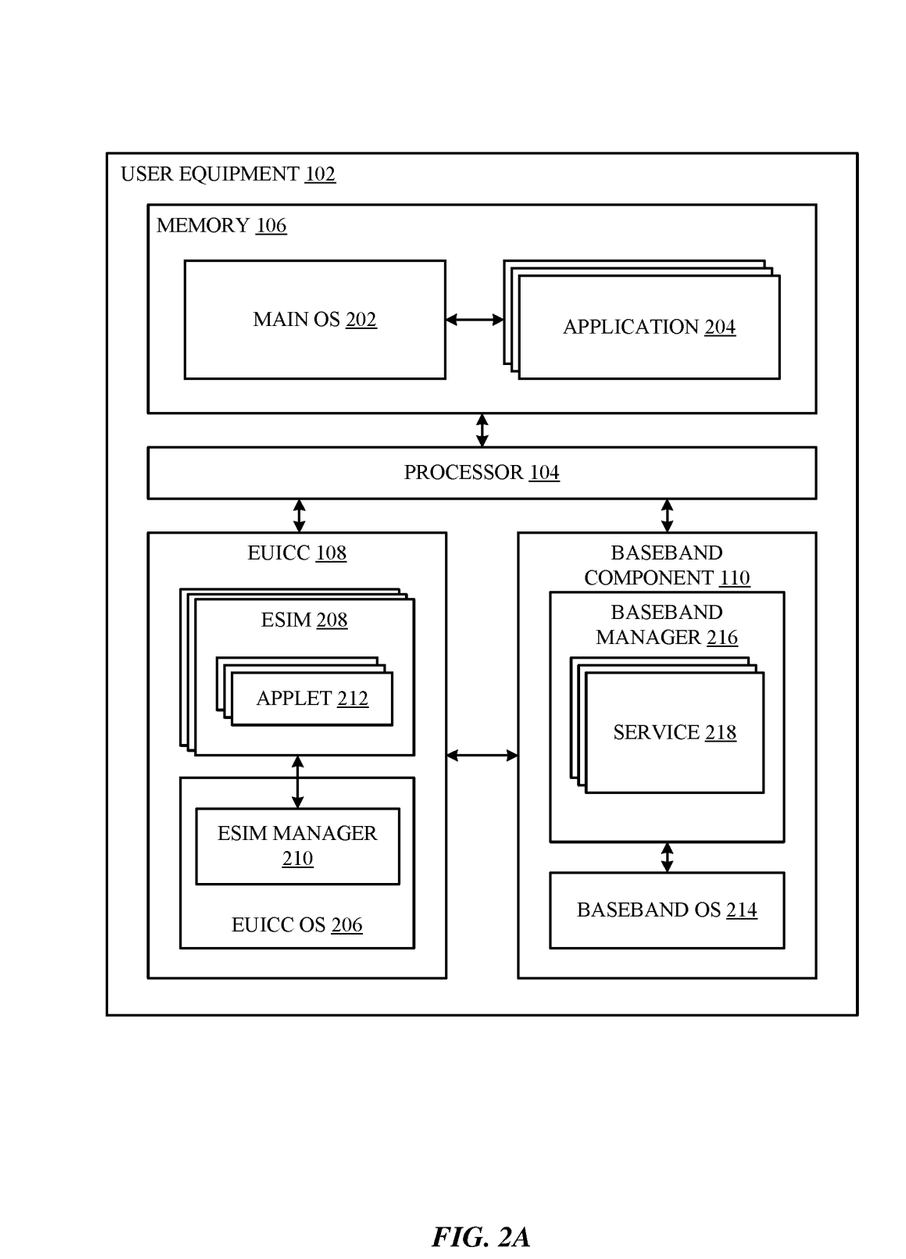
FIGS. 2A and 2B illustrate block diagrams of a more detailed view of exemplary components of the system of FIG. 1, according to some embodiments.

FIG. 2A illustrates a block diagram of a more detailed view 200 of particular components of the UE 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2A, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, or otherwise performing management of the eSIMs 208 within the eUICC 108 and providing the baseband component 110 with access to the eSIMs 208 to provide access to wireless services for the UE 102. The eUICC 108 OS can include an eSIM manager 210, which can perform management functions for various eSIMs. According to the illustration shown in FIG. 2A, each eSIM 208 can include a number of applets 212 that define the manner in which the eSIM 208 operates. For example, one or more of the applets 212, when implemented by the baseband component 110 and the eUICC 108, can be configured to enable the UE 102 to communicate with an MNO 114 and provide useful features (e.g., phone calls and internet) to a user of the UE 102.

As also shown in FIG. 2A, the baseband component 110 of the UE 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the UE 102 and MNOs 114 according to the different eSIMs 208 that are enabled within the eUICC 108.

In some embodiments, the UE 102 can be restricted to operate with cellular wireless networks associated with a particular wireless service provider, or equivalently mobile network operator (MNO). In some embodiments, the UE 102 can include a lock mechanism that determines whether the UE 102 can attach to a cellular wireless network using an eSIM 208. This lock mechanism can also be referred to, in some embodiments, as a SIM lock, an eSIM lock, a subsidy lock, and/or a network lock. In some embodiments, the lock mechanism is implemented in the baseband component 110 of the UE 102 using information provided by the eUICC 108. In some embodiments, the lock mechanism is implemented using both the eUICC 108, e.g., the eUICC OS 206 and/or eSIM manager 210 in combination with the baseband component 110, e.g., the baseband manager 216 and/or the baseband OS 214. In some embodiments, the lock mechanism is implemented solely within the eUICC 108 using the eUICC OS 206 and/or the eSIM manager in communication with one or more eSIMs 208.

Figure 2B:
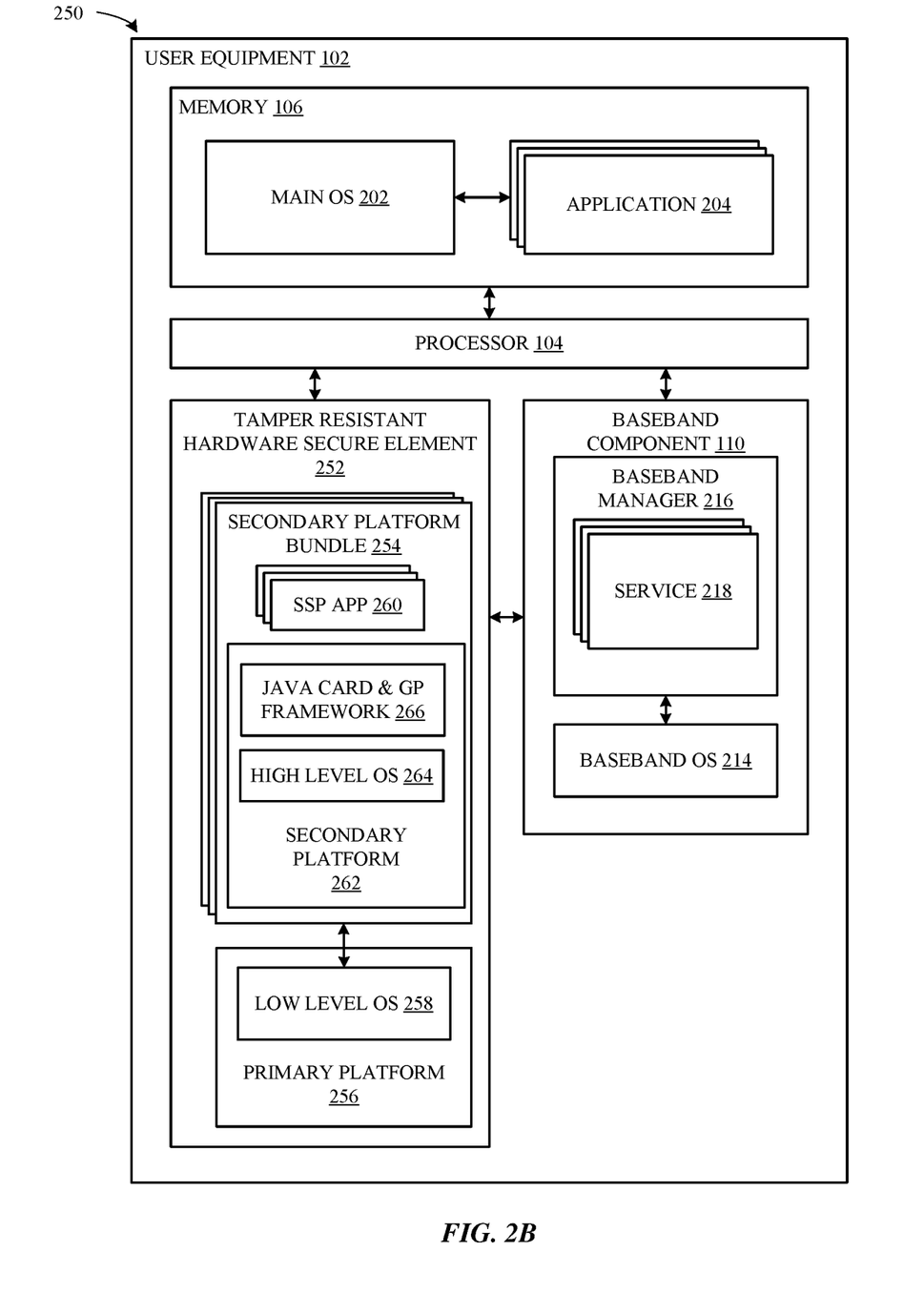

FIG. 2B illustrates a block diagram of another more detailed view 250 of particular components of the UE 102 of FIG. 1, according to some embodiments. As shown in FIG. 2B, the processor 104, in conjunction with the memory 106, can implement a main operating system (OS) 202 that is configured to execute applications 204 (e.g., native OS applications and user applications). The UE 102 can include a tamper resistant hardware secure element (SE) 252, which can be equivalent to and/or a generalization of the eUICC 108 of FIG. 2A. The tamper resistant hardware SE 252 can be configured to include a primary platform 256, which manages aspects of the tamper resistant hardware SE 252 as a whole, and one or more secondary platform bundles 243. The primary platform can implement a low level OS 258 that manages hardware resources of the tamper resistant hardware SE 252 (e.g., a processor and a memory embedded in the tamper resistant hardware SE 252). The low level OS 258 can also be configured to manage one or more secondary platform bundles 254, which can be provided by MNOs 114 via provisioning servers 116. Each secondary platform bundle 254 can include its own secondary platform 262, separate from and/or supplemental to the primary platform 256 for the tamper resistant hardware SE 252. The secondary platform 262 also includes a high level OS 264 and optionally a Java card and GlobalPlatform framework 266. The high level OS 264 can manage aspects of the secondary platform 262 including management of one or more smart secure platform (SSP) applications 260. In some embodiments, an SSP application 260, as depicted in FIG. 2B, is equivalent to and/or a generalization of an eSIM 208 of an eUICC 108 as depicted in FIG. 2A. The high level OS 264, alone or in conjunction with the low level OS 258, can manage the SSP applications 260 stored in the secondary platform bundle 254 of the tamper resistant hardware SE 252. Management operations can include loading, storing, enabling, disabling, modifying, or similar functions for management of the SSP applications 260 within the secondary platform bundle 254 of the tamper resistant hardware SE 252. An SSP application 260 in conjunction with the baseband component 110 can provide for access to wireless services of an MNO 114 for the UE 102.

The baseband component 110 of the UE 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the tamper resistant hardware SE 252 to establish a secure channel with a provisioning server 116 and obtaining information (such as a secondary platform bundle 254 and/or an SSP application 260) from the provisioning server 116. The baseband manager 216 can be configured to implement services 218, which represents a collection of software modules that are instantiated by way of enabled SSP applications 260 that are included in the secondary platform bundles 254 of the tamper resistant hardware SE 252.

In some embodiments, the UE 102 can be restricted to operate with cellular wireless networks associated with a particular wireless service provider, or equivalently mobile network operator (MNO). In some embodiments, the UE 102 can include a lock mechanism that determines whether the UE 102 can attach to a cellular wireless network using an SSP application 260. In some embodiments, the lock mechanism is implemented in the baseband component 110 of the UE 102 using information provided by the tamper resistant hardware SE 252. In some embodiments, the lock mechanism is implemented using both the tamper resistant hardware SE 252, e.g., the low level OS 258 and/or the high level OS 264 in combination with the baseband component 110, e.g., the baseband manager 216 and/or the baseband OS 214. In some embodiments, the lock mechanism is implemented solely within the tamper resistant hardware SE 252 using the low level OS 258 and or the high level OS 264. In some embodiments, the low level OS 258 uses information provided by a secondary platform 262 to implement the lock mechanism. In some embodiments, the information is obtained at least in part from one or more SSP applications 260.

In some embodiments, implementation of the lock mechanism can be functionally divided between the low level OS 258 of the primary platform 256 and the high level OS 264 of the secondary platform 262. In some embodiments, the low level OS 258 of the primary platform 256 controls which secondary platform bundle 254 can be installed, enabled, and/or made active based on a type of service offered by the secondary platform bundle 254, such as a telecommunications service versus a banking service. After the secondary platform bundle 254 is enabled or made active, the high level OS 264 of the secondary platform bundle 254 can additionally enforce a lock mechanism that is defined within the secondary platform 262 and/or within one or more SSP applications 260. The lock mechanism can be partially controlled by the low level OS 258 of the primary platform 256 to enable a secondary platform bundle 254 and partially controlled by the high level OS 264 based on policies in the high level OS 264 and/or within the individual SSP applications 260.

In some embodiments, the low level OS 258 of the primary platform 256 controls whether a secondary platform bundle 254 can be installed, enabled, and/or made active based on locking control information included within the secondary platform bundle 254, e.g., a lock policy described within metadata of the secondary platform bundle 254. The low level OS 258 can determine whether a management action that causes a state change for a secondary platform bundle 254 is consistent both a first lock policy defined at the primary platform level 256 and a second lock policy defined at the secondary platform level 258, where the first and second lock policies can each be defined by different entities within an ecosystem that provides wireless services.

Figure 3:
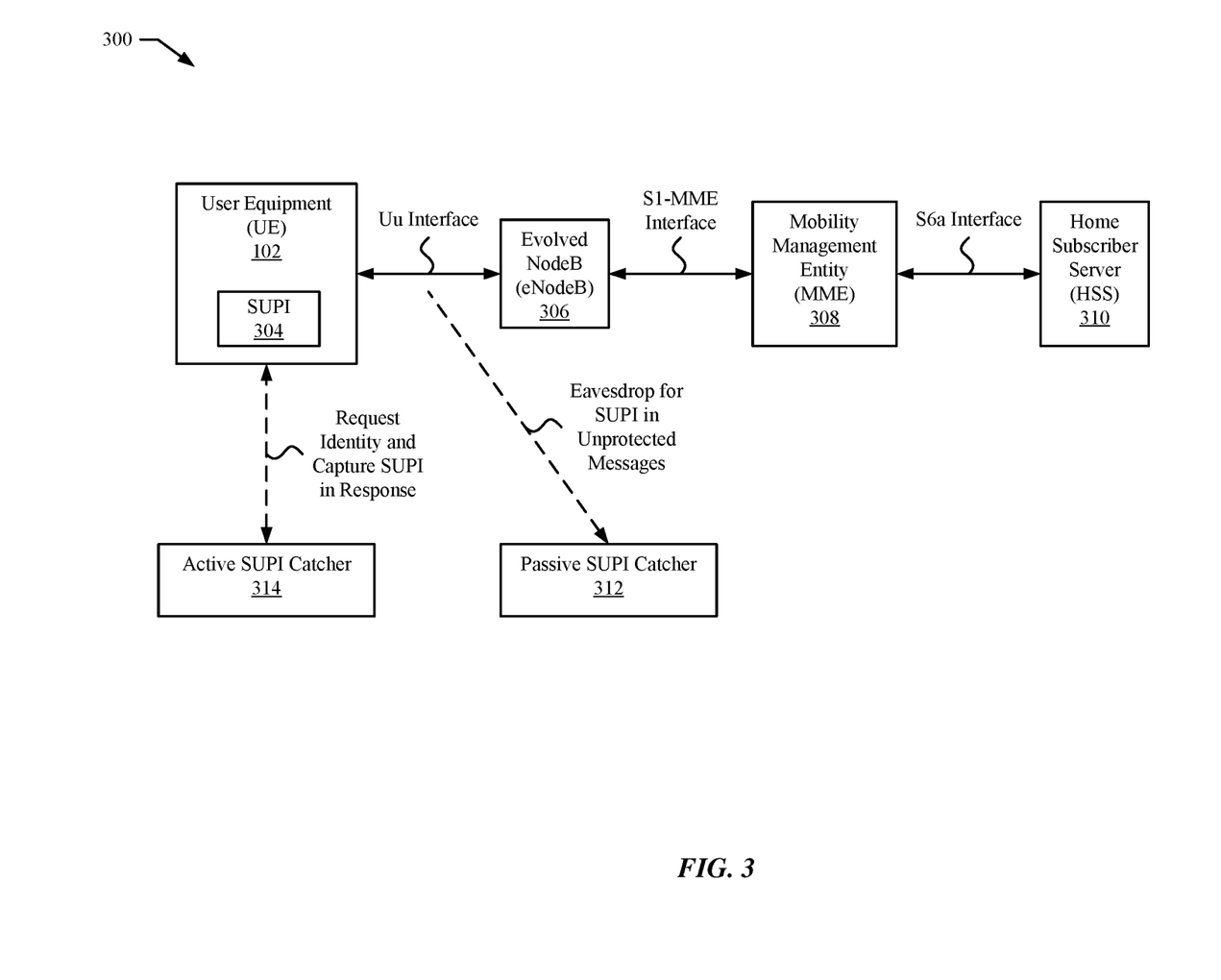
FIG. 3 illustrates a block diagram of an exemplary system subject to capture of subscriber identities, according to some embodiments.

FIG. 3 illustrates a block diagram 300 of an exemplary system subject to capture of subscriber identities. The system includes a UE 102, which includes an unencrypted subscription permanent identifier (SUPI) 304 by which a subscription for a user of the UE 102 can be uniquely identified, in communication with an exemplary cellular wireless network entity, namely an evolved NodeB (eNodeB) 306. An example of a SUPI 304 includes an international mobile subscriber identity (IMSI). The UE 102 and the eNodeB 306 can communicate via a Uu interface, which for some messages or for certain periods of time, such as prior to establishment of a secure connection between the UE 102 and the eNodeB 306, can be subject to eavesdropping by a third party. While the eNodeB 306 connects to a Mobility Management Entity (MME) 308 of the core network via a secure S1-MME interface, and the MME 308 connects to a Home Subscriber Server (HSS) 310 via a secure S6a interface, the eNodeB 306 can send some messages to and receive some messages from the UE 102 "in the clear", in some instances. For example, a Radio Resource Control (RRC) paging message sent from the eNodeB 306 to the UE 102 can include the SUPI 304 of the UE 102 in an unprotected manner. Similarly, certain RRC network access stratum (NAS) messages send from the UE 102 to the eNodeB 306 can also include the SUPI 304 of the UE 102 without using encryption to protect the SUPI 304 from eavesdroppers. Example RRC NAS messages include an RRC Attach Request message, a UE originating RRC Detach Request message, and an RRC Identity Response message. A passive eavesdropping entity, such as passive SUPI catcher 312, can listen for communication sent from the eNodeB 306, such as paging messages, or sent from the UE 102, such as attach/detach request messages, and ascertain the SUPI 304 of the UE 102. Additionally, an active eavesdropping entity, such as active SUPI catcher 314, can mimic communication from the eNodeB 306 and send a Request Identity message to the UE 102 and receive an Identity Response message that includes the SUPI 304 of the UE 102. The Uu interface between the UE 102 and the eNodeB 306 is susceptible to SUPI exposure due to passive and/or active attacks. By having the UE 102 and the eNodeB 306 securely encrypt at least a portion of the SUPI 304, such as the mobile subscriber identification number (MSIN), when communicating over an insecure communication link, the SUPI 304 can be protected from eavesdropping. An encrypted version of the SUPI 304 can be referred to as a subscription concealed identifier (SUCI).

Figure 4A:
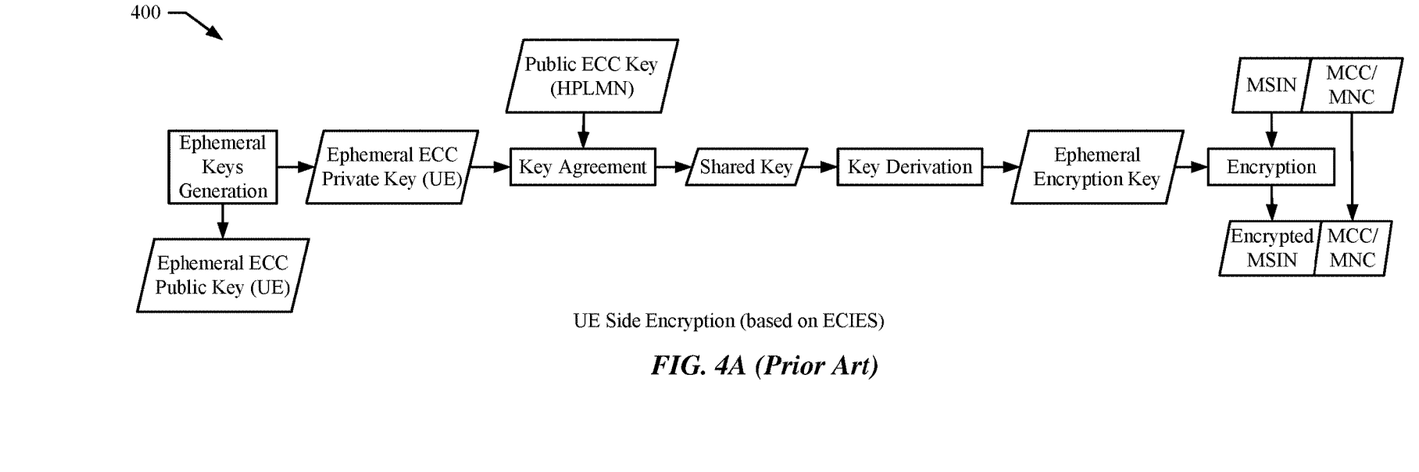
FIGS. 4A and 4B illustrate flow diagrams of a prior art encryption technique to protect a subscriber identity.
Figure 4B:
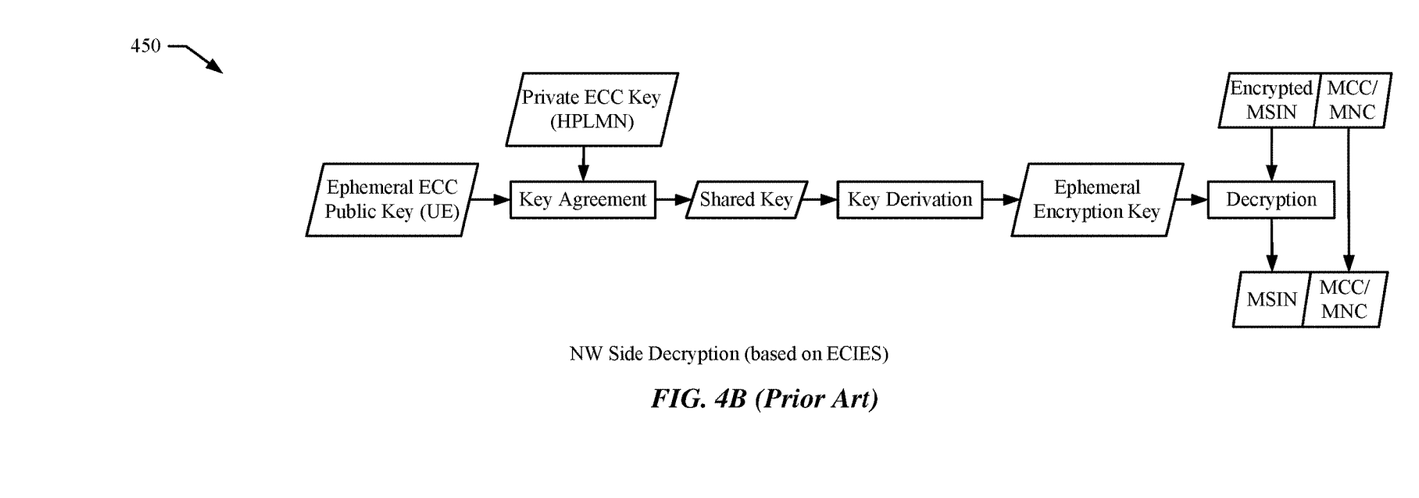

FIGS. 4A and 4B illustrate flow diagrams 400/450 of a prior art encryption technique to protect a subscriber identity. For the UE side encryption flow diagram 400, the UE 102 generates ephemeral key pairs, which include an ephemeral UE public key that can be provided to another party, such as to a cellular wireless network side entity, e.g., the eNodeB 306, and an ephemeral UE private key (which can also be referred to as a secret key). Based on a key agreement, which both the UE 102 and the cellular wireless network entity know, the UE 102 can generate a shared key (which can also be referred to as a shared secret) based on ephemeral UE private key and a public network key (also referred as a public ECC key for the Home Public Land Mobile Network or HPLMN). Similarly, the cellular wireless network entity, e.g., the eNodeB 306, can generate the shared key based on the key agreement using the ephemeral UE public key provided by the UE 102 to the cellular wireless network entity and a private (secret) network key that corresponds to the public network key known to the UE 102. The UE 102 and the cellular wireless network entity can use a common key derivation technique to determine an ephemeral encryption key with which to encrypt (to form a SUCI from the SUPI 304) and to decrypt (to recover the SUPI 304 from the SUCI). In some embodiments, the MSIN portion of the SUPI 304 is encrypted while the MCC/MNC portion of the SUPI 304 can remain unencrypted. Both the UE side encryption and the network side encryption can be based on an Elliptic Curve Integrated Encryption Scheme (ECIES). The encryption technique illustrated in FIGS. 4A and 4B can be based on static network public and private (secret) keys and as such, should the static network private key be compromised, previous communications that include the SUPI encrypted with the static network public key can be decrypted. Changing network public keys over time can overcome this deficiency.

Figure 5:
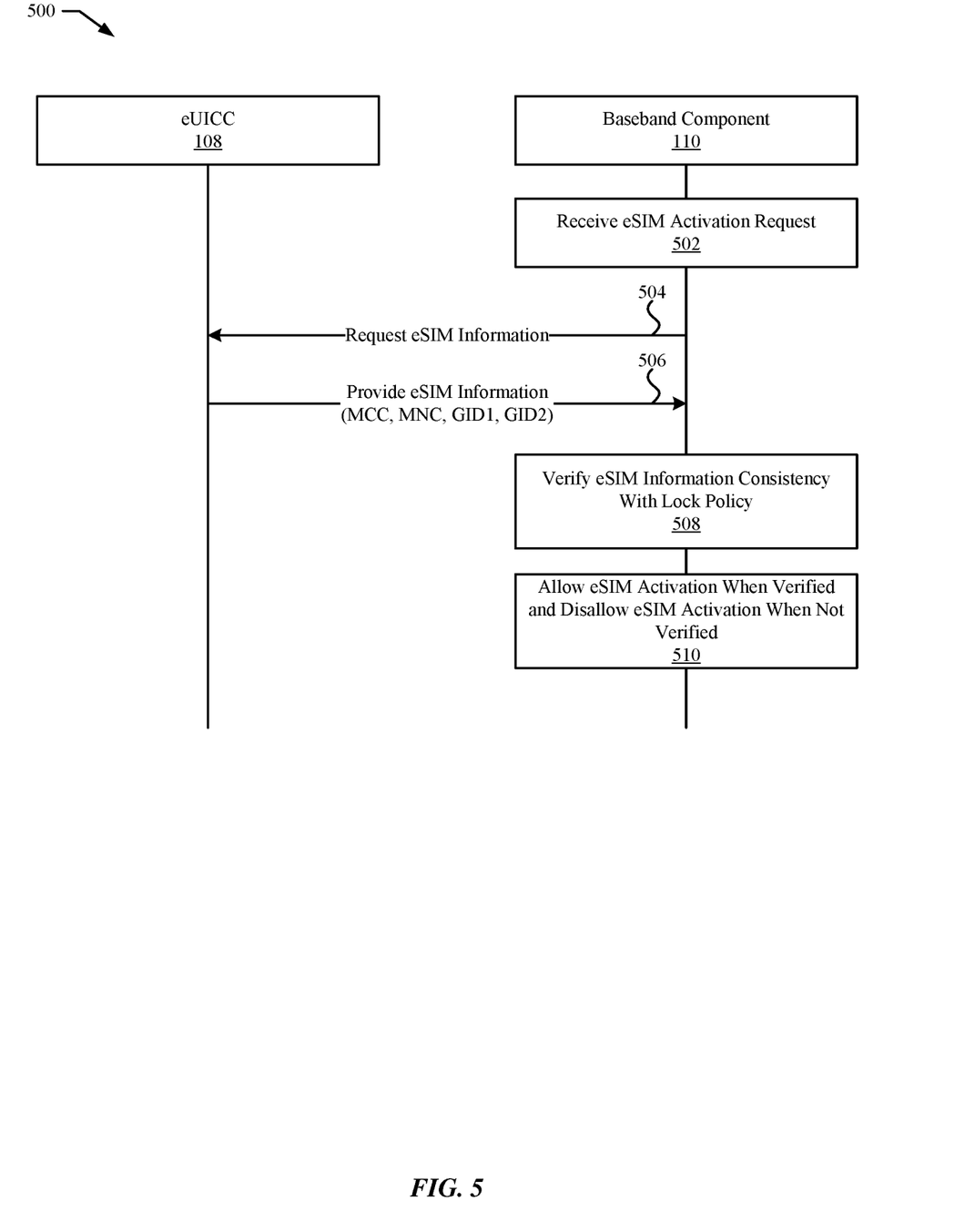
FIG. 5 illustrates an exemplary message exchange to verify eSIM activation based on a lock policy while maintaining subscriber identity privacy, according to some embodiments.

FIG. 5 illustrates an exemplary message exchange 500 to restrict activation of an eSIM 208 of an eUICC 108. While FIG. 5 depicts actions performed by elements of the UE 102 to determine whether to allow or disallow activation of an eSIM 208, similar actions can be performed in response to any of one or more requested management operations to be performed for one or more eSIMs 208, such as for loading, installing, enabling, disabling, modifying or similar operations. At 502, the baseband component 110 receives an activation request (or other eSIM management operation) for an eSIM 208 of the eUICC 108 of the UE 102. The activation request may be triggered by a user of the UE 102 and/or by an OS action for the main OS 202 or the baseband OS 214 of the UE 102, such as during initialization or software updating of the UE 102. At 504, the baseband component 110 requests information about the eSIM 208 for which the activation request pertains. In some embodiments, the baseband component 110 requests all or a portion of a SUPI (or IMSI) for the eSIM 208. In some embodiments, the baseband component 110 requests information that indicates for which country, region, or geographic area the eSIM 208 can be used and/or for which cellular wireless networks and/or mobile network operators for which the eSIM 208 can be used to access services. At 506, the eUICC 108 provides information about the eSIM 208 for which activation is sought. In some embodiments, the information about the eSIM 208 includes one or more of: a mobile country code (MCC), a mobile network code (MNC), a first group identifier (GID1), or a second group identifier (GID2). In some embodiments, the information about the eSIM 208 allows the baseband component to determine whether to activate the eSIM 208 (or perform another eSIM management operation) in conjunction with a lock policy for the UE 102. At 508, the baseband component 110 verifies whether the information about the eSIM 208 provided by the eUICC 108 is consistent with a lock policy applicable to the UE 102. In some embodiments, the baseband component 110 compares the information about the eSIM 208, such as MCC/MNC values, with the lock policy to determine whether a cellular wireless network (or particular services provided thereof) can be allowed to be accessed by the UE 102 using the eSIM 208. At 510, the baseband component 110 allows activation of the eSIM 208 when the verification is successful and disallows activation of the eSIM 208 when the verification is not successful.

Figure 6A:
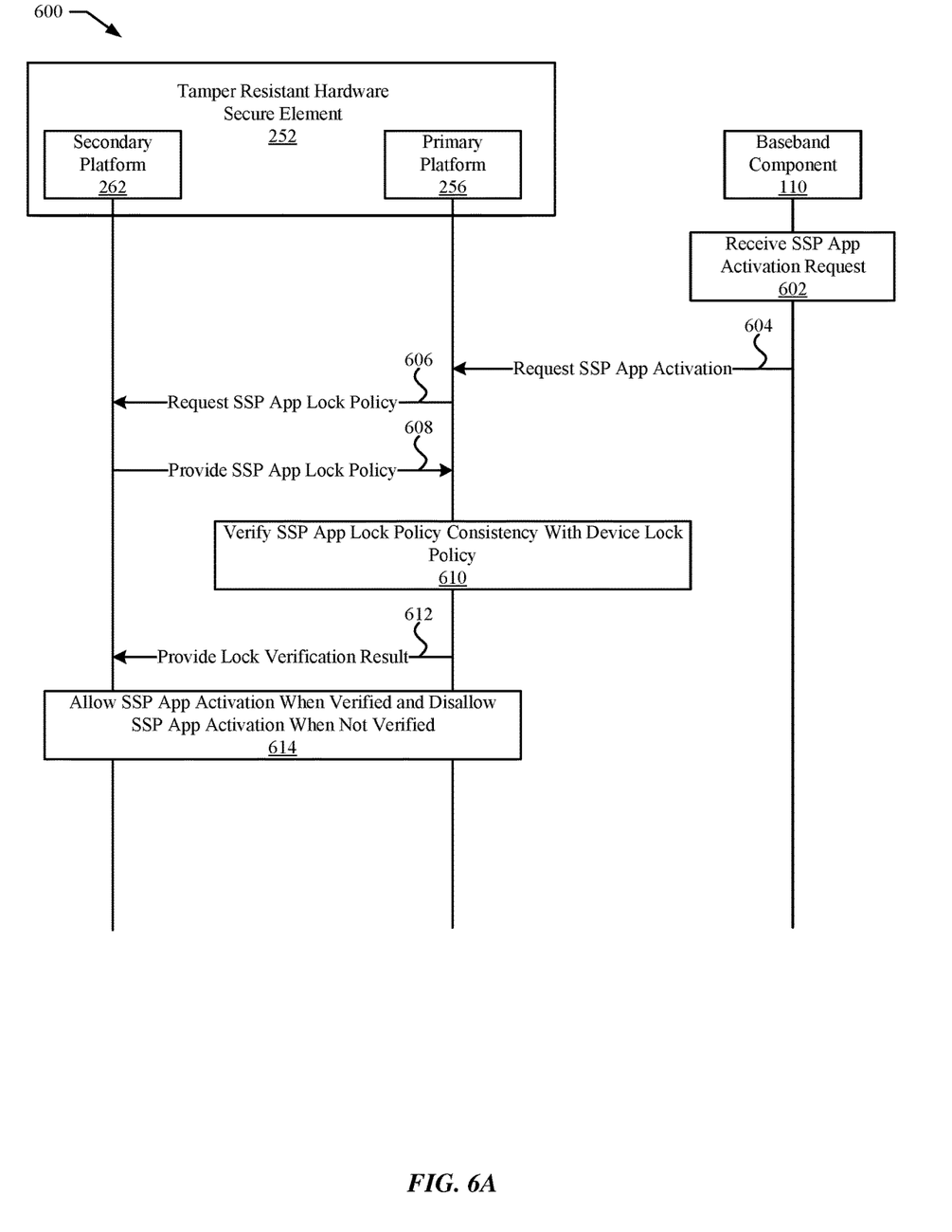
FIGS. 6A and 6B illustrate another set of exemplary message exchanges to verify SSP application activation based on a lock policy, according to some embodiments.

FIG. 6A illustrates a diagram 600 of another exemplary message exchange to restrict activation of a smart secure platform (SSP) application 260, such as an eSIM 208, of a tamper resistant hardware SE 252 of a UE 102. While FIG. 6A depicts actions performed by elements of the UE 102 to determine whether to allow or disallow activation of an SSP application 260, similar actions can be performed in response to any of one or more requested management operations to be performed for one or more SSP applications 260, such as for loading, installing, enabling, disabling, modifying or similar operations. At 602, the baseband component 110 receives a request to activate (or to perform another management operation for) an SSP application 260 of the tamper resistant hardware SE 252. The activation request may be triggered by a user of the UE 102 and/or by an OS action for the main OS 202 or the baseband OS 214 of the UE 102, such as during initialization or software updating of the UE 102. At 604, the baseband component 110 submits the activation request for the SSP application 260 to the primary platform 256 of the tamper resistant hardware SE 252. At 606, the primary platform 256, such as by a low level OS 258 of the primary platform 256, requests from the secondary platform 262 a lock policy for the SSP application 260. The SSP application 260 can be resident in a secondary platform bundle 254 that also includes the secondary platform 262 as illustrated in FIG. 2B. In some embodiments, the low level OS 258 of the primary platform 256 communicates with the high level OS 264 of the secondary platform bundle to determine whether to perform the management action, such as activation, for the SSP application 260. At 608, the secondary platform 262 provides the lock policy for the SSP application to the primary platform 256. In some embodiments, the high level OS 264 obtains the lock policy from the SSP application 260 and provides the lock policy to the low level OS 258. At 610, the primary platform 256, such as by the low level OS 258, verifies whether the lock policy for the SSP application 260 is consistent with a device lock policy applicable to the UE 102. At 612, the primary platform 256 communicates the lock verification result to the secondary platform 262. At 614, the secondary platform 262, alone or in combination with the primary platform 256, allows activation of the SSP application 260 when the lock policy for the SSP application 260 is consistent with the device lock policy for the UE 102 and disallows activation of the SSP application 260 when the lock policy for the SSP application 260 is not consistent with the device lock policy for the UE 102. In some embodiments, verification is performed by comparing a portion of an unencrypted SUPI (or IMSI) for the SSP application 260 with values obtained from the device lock policy for the UE 102 to determine whether the UE 102 is permitted to access services and/or to associate with a cellular wireless network for which services can be accessed using the SSP application 260.

Figure 6B:
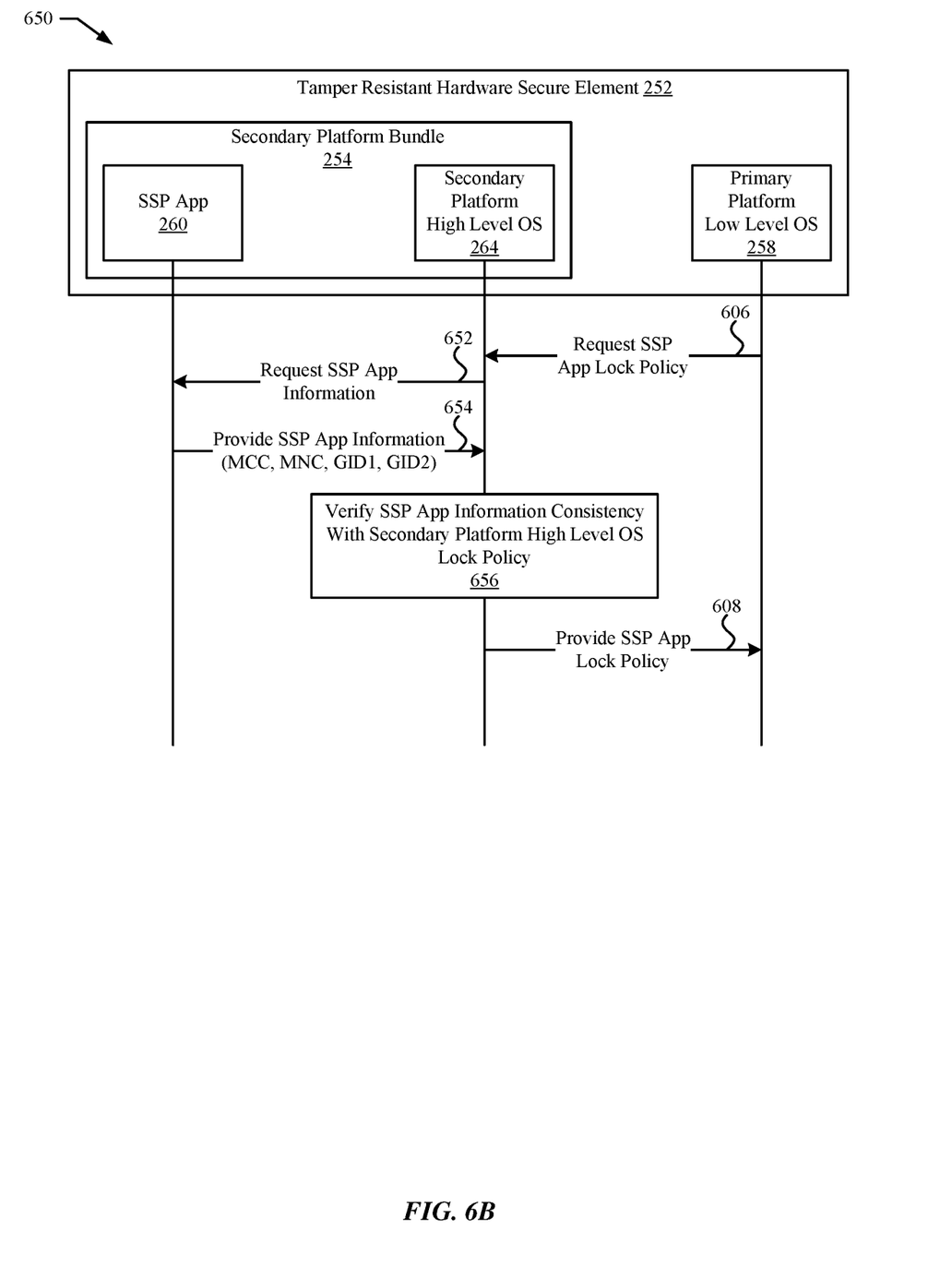

FIG. 6B illustrates a diagram 650 of actions that elements of the tamper resistant hardware SE 252 can perform to verify whether a management action, e.g., activation, for an SSP application 260 can be allowed or disallowed. In response to receipt at 606 of the request for the lock policy of the SSP application 260 from the low level OS 258 of the primary platform 256, the high level OS 264 of the secondary platform 262 at 652 requests information from the SSP application 260, which is co-resident with the secondary platform 262 in the secondary platform bundle 254. At 654, the SSP application 260 provides information for the SSP application 654. In some embodiments, the information for the SSP application 654 includes one or more values for identifiers that indicate for which wireless network service provider (or MNO 114) and/or for which cellular wireless networks the SSP application 260 can provide access to services. In some embodiments, the information for the SSP application 654 includes information from an unencrypted SUPI (or IMSI) and/or from an unencrypted portion of a SUCI. In some embodiments, the information for the SSP application 654 includes one or more of: a mobile country code (MCC), a mobile network code (MNC), a first group identifier (GID1), or a second group identifier (GID2). At 656, the secondary platform high level OS 264 verifies whether the information for the SSP application 654 is consistent with a high level OS lock policy. In some embodiments, the secondary platform high level OS 264 provides information derived from the SSP application 260 and/or based on the verification to the primary platform low level OS 258 (action not shown in FIG. 6B). As shown in FIG. 6A, the primary platform 256 and/or the secondary platform 262 can determine alone or in combination whether to allow or disallow a management operation to be performed for the SSP application 260, such as whether to perform activation of the SSP application 260. In some embodiments, the primary platform 256 provides its own lock verification result to the secondary platform 262 (as shown at 612 in FIG. 6B) and the secondary platform provides its own lock verification result to the primary platform 256 (not shown).

In some embodiments, a method for cellular wireless access network control in a UE 102 includes actions performed by a baseband component 110 of the UE 102 and by elements of a tamper resistant hardware SE 252 of the UE 102. The baseband component 110 of the UE 102 obtains an indication to activate an SSP application 260 and sends to the tamper resistant hardware SE 252 of the UE 102 a request to activate the SSP application 260. A primary platform 256 of the tamper resistant hardware SE 252 receives the request to activate the SSP application 260 and requests and obtains from a secondary platform 262 of the tamper resistant hardware SE 252 of the UE 102 an SSP application lock policy for the SSP application 260. The primary platform 256 verifies whether the SSP application lock policy of the SSP application 260 is consistent with a device lock policy for the UE 102 and provides to the secondary platform 262 a lock policy verification result. The primary platform 256 and the secondary platform 262 allow activation of the SSP application 260 when the SSP application lock policy for the SSP application 260 is consistent with the device lock policy for the UE 102.

In some embodiments, the device lock policy for the UE 102 indicates one or more cellular wireless service providers to which the UE 102 is restricted for access. In some embodiments, the SSP application lock policy for the SSP application 260 indicates a cellular wireless service provider, such as an MNO 114, for which the SSP application 260 provides access. In some embodiments, the primary platform 256 verifies whether the SSP application lock policy for the SSP application 260 is consistent with the device lock policy for the UE 102 based on whether the cellular wireless service provider for which the SSP application 260 provides access is included in the one or more cellular wireless service providers to which the UE 102 is restricted to access. In some embodiments, the method further includes actions performed by the secondary platform 262 including: receiving, from the primary platform 256, the request for the SSP application lock policy for the SSP application 260, obtaining SSP application information, and verifying consistency between the SSP application information and the SSP application lock policy. In some embodiments, the SSP application information includes a mobile country code (MCC) and a mobile network code (MNC). In some embodiments, the SSP application information further includes one or more group identifiers. In some embodiments, the primary platform 256 and the secondary platform 262 disallow activation of the SSP application 260 when the SSP application lock policy is inconsistent with the device lock policy for the UE 102.

In some embodiments, a method for cellular wireless access network control in a UE 102 includes actions performed by a baseband component 110 of the UE 102 including: (i) obtaining an indication to activate an eSIM 208; (ii) sending, to an eUICC 108 of the UE 102, a request for eSIM information; (iii) receiving, from the eUICC 108, the eSIM information; (iv) verifying consistency of the eSIM information with a device lock policy for the UE 102; and (v) allowing activation of the eSIM 208 when verification succeeds.

In some embodiments, the method further includes the baseband component 110 of the UE 102 disallowing activation of the eSIM 208 when verification fails. In some embodiments, the eSIM information includes a mobile country code (MCC) and a mobile network code (MNC). In some embodiments, the eSIM information further includes one or more group identifiers, such as GID1 and/or GID2. In some embodiments, the device lock policy for the UE 102 indicates one or more cellular wireless service providers to which the UE 102 is restricted for access. In some embodiments, the eSIM information indicates a cellular wireless service provider for which the eSIM 208 provides access. In some embodiments, the baseband component 110 of the UE 102 verifies the eSIM information is consistent with the device lock policy for the UE 102 based on whether the cellular wireless service provider for which the eSIM 208 provides access is included in the one or more cellular wireless service providers to which the UE 102 is restricted to access. In some embodiments, the eSIM information is provided in a false subscription permanent identifier (SUPI) that includes an all zeroes value for a mobile subscriber identification number (MSIN) of the false SUPI. In some embodiments, the eUICC 108 maintains an unencrypted form of an actual SUPI 304 and an encrypted form of the actual SUPI 304, such as a SUCI. In some embodiments, the baseband component 110 is restricted from access to the unencrypted form of the actual SUPI 304.

Various embodiments can include an apparatus configurable for operation in a UE 102 including a processor and a memory storing instructions that, when executed by the process, cause the UE 102 to perform a method including a set of actions to manage cellular wireless network access as described herein. Additional embodiments can include a UE 102 including wireless circuitry configurable for wireless communication with a wireless network; and processing circuitry communicatively coupled to the wireless circuitry and comprising a processor and a memory storing instructions that, when executed by the processor, cause the UE 102 to perform a method to manage cellular wireless network access as described herein.

Figure 7:
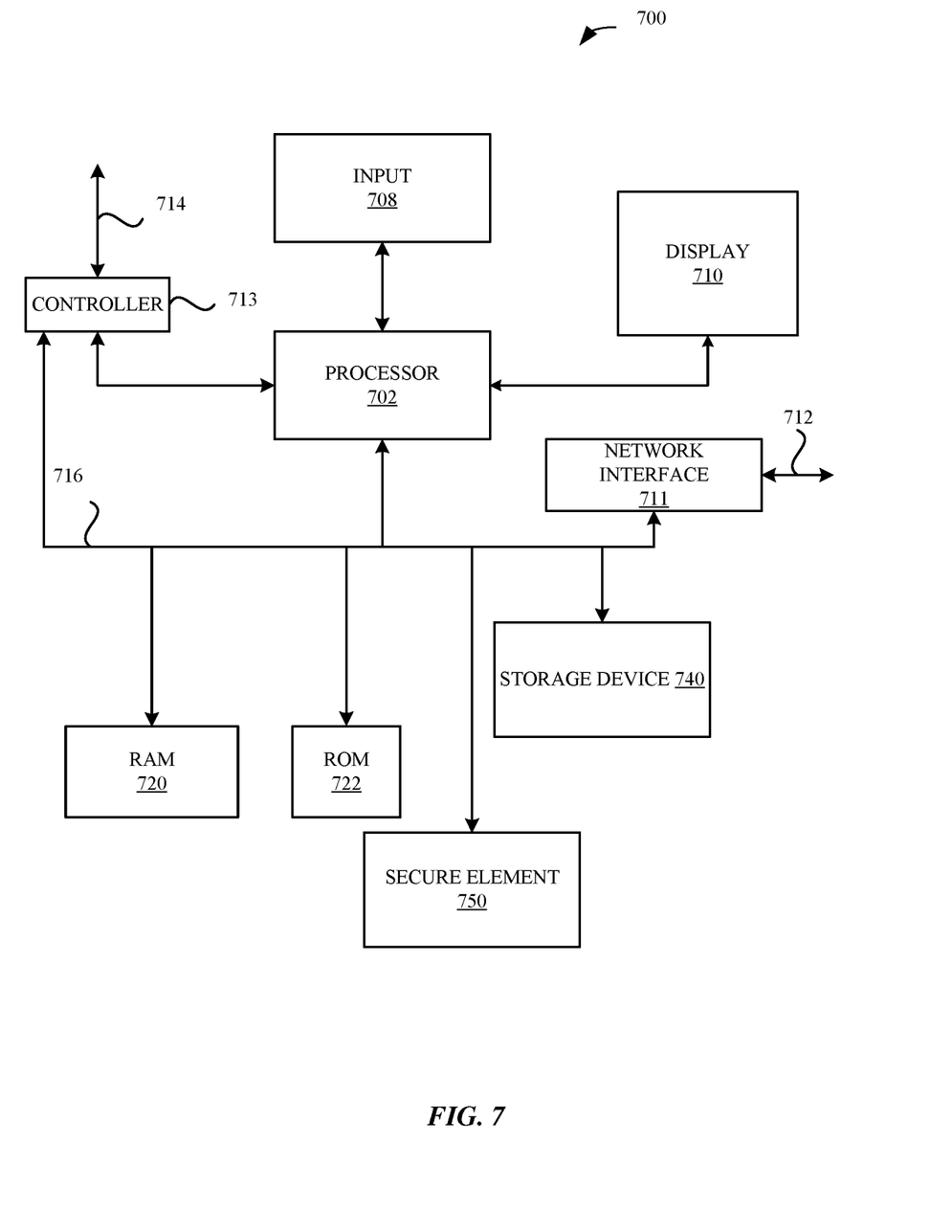
FIG. 7 illustrates a detailed view of a representative computing device that can be used to implement various methods described herein, according to some embodiments.

FIG. 7 illustrates a detailed view of a representative computing device 700 that can be used to implement various methods described herein, according to some embodiments. In particular, the detailed view illustrates various components that can be included in the UE 102 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also includes a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include a secure element (SE) 750, which can represent an eUICC 108 and/or a tamper resistant SE 252 of the UE 102.

The various aspects, embodiments, implementations or features of the described embodiments can be used separately or in any combination. Software, hardware, or a combination of hardware and software can implement various aspects of the described embodiments. The described embodiments can also be embodied as computer readable code on a non-transitory computer readable medium. The non-transitory computer readable medium is any data storage device that can store data, which can thereafter be read by a computer system. Examples of the non-transitory computer readable medium include read-only memory, random-access memory, CD-ROMs, DVDs, magnetic tape, hard disk drives, solid state drives, and optical data storage devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A user equipment (UE) configured for cellular wireless access network control, the UE comprising:
   one or more antennas;
   a baseband component communicatively coupled to the one or more antennas and configured to perform actions including:
   obtaining an indication to activate a smart secure platform (SSP) application; and sending, to a tamper resistant hardware secure element of the UE, a request to activate the SSP application; and the tamper resistant hardware secure element communicatively coupled to the baseband component and comprising a primary platform configured to perform actions including:

receiving, from the baseband component of the UE, the request to activate the SSP application;

requesting, from a secondary platform of the tamper resistant hardware secure element of the UE, an SSP application lock policy for the SSP application;

obtaining, from the secondary platform, the SSP application lock policy for the SSP application;

verifying whether the SSP application lock policy for the SSP application is consistent with a device lock policy for the UE; and providing, to the secondary platform, a lock policy verification result, wherein the primary platform and the secondary platform allow activation of the SSP application when the SSP application lock policy is consistent with the device lock policy for the UE.

2. The UE of claim 1, wherein the device lock policy for the UE indicates one or more cellular wireless service providers to which the UE is restricted for access.

3. The UE of claim 2, wherein the SSP application lock policy for the SSP application indicates a cellular wireless service provider for which the SSP application provides access.

4. The UE of claim 3, wherein the primary platform verifies whether the SSP application lock policy for the SSP application is consistent with the device lock policy for the UE based on whether the cellular wireless service provider for which the SSP application provides access is included in the one or more cellular wireless service providers to which the UE is restricted to access.

5. The UE of claim 1, further comprising:

the secondary platform of the tamper resistance hardware secure element configured to perform actions including:

receiving, from the primary platform, request for the SSP application lock policy for the SSP application;

obtaining SSP application information; and verifying consistency between the SSP application information and the SSP application lock policy.

6. The UE of claim 5, wherein the SSP application information comprises a mobile country code (MCC) and a mobile network code (MNC).

7. The UE of claim 6, wherein the SSP application information further comprises one or more group identifiers.

8. The UE of claim 1, wherein the primary platform and the secondary platform disallow activation of the SSP application when the SSP application lock policy is inconsistent with the device lock policy for the UE.

9. A tamper resistant hardware secure element (SE) of a user equipment (UE), the tamper resistant hardware SE comprising:

a primary platform and a secondary platform, the primary platform configured to perform actions including:

receiving, from a baseband component of the UE, a request to activate a smart secure platform (SSP) application;

requesting, from the secondary platform, an SSP application lock policy for the SSP application;

obtaining, from the secondary platform, the SSP application lock policy for the SSP application;

verifying whether the SSP application lock policy for the SSP application is consistent with a device lock policy for the UE; and providing, to the secondary platform, a lock policy verification result, wherein the primary platform and the secondary platform allow activation of the SSP application when the SSP application lock policy is consistent with the device lock policy for the UE.

10. The tamper resistant hardware SE of claim 9, wherein the secondary platform is configured to perform actions including:

receiving, from the primary platform, request for the SSP application lock policy for the SSP application;

obtaining SSP application information; and verifying consistency between the SSP application information and the SSP application lock policy.

11. The tamper resistant hardware SE of claim 10, wherein the SSP application information comprises a mobile country code (MCC) and a mobile network code (MNC).

12. The tamper resistant hardware SE of claim 11, wherein the SSP application information further comprises one or more group identifiers.

13. The tamper resistant hardware SE of claim 9, wherein the primary platform and the secondary platform disallow activation of the SSP application when the SSP application lock policy is inconsistent with the device lock policy for the UE.

14. The tamper resistant hardware of claim 9, wherein the device lock policy for the UE indicates one or more cellular wireless service providers to which the UE is restricted for access.

15. The tamper resistant hardware of claim 14, wherein the SSP application lock policy for the SSP application indicates a cellular wireless service provider for which the SSP application provides access.

16. The tamper resistant hardware of claim 15, wherein the primary platform verifies whether the SSP application lock policy for the SSP application is consistent with the device lock policy for the UE based on whether the cellular wireless service provider for which the SSP application provides access is included in the one or more cellular wireless service providers to which the UE is restricted to access.

17. A method for managing a smart secure platform (SSP) application on a user equipment (UE), the method comprising:

by a tamper resistant hardware secure element comprising a primary platform and a secondary platform, the primary platform configured to perform actions including:

receiving, from a baseband component of the UE, the request to activate the SSP application;

requesting, from the secondary platform, an SSP application lock policy for the SSP application;

obtaining, from the secondary platform, the SSP application lock policy for the SSP application;

verifying whether the SSP application lock policy for the SSP application is consistent with a device lock policy for the UE; and providing, to the secondary platform, a lock policy verification result, wherein the primary platform and the secondary platform allow activation of the SSP application when the SSP application lock policy is consistent with the device lock policy for the UE.

18. The method of claim 17, further comprising:
by the secondary platform:
receiving, from the primary platform, request for the SSP application lock policy for the SSP application;
obtaining SSP application information; and
verifying consistency between the SSP application information and the SSP application lock policy.

19. The method of claim 17, wherein the primary platform and the secondary platform disallow activation of the SSP application when the SSP application lock policy is inconsistent with the device lock policy for the UE.

20. The method of claim 17, wherein:
the device lock policy for the UE indicates one or more cellular wireless service providers to which the UE is restricted for access;
the SSP application lock policy for the SSP application indicates a cellular wireless service provider for which the SSP application provides access; and
the primary platform verifies whether the SSP application lock policy for the SSP application is consistent with the device lock policy for the UE based on whether the cellular wireless service provider for which the SSP application provides access is included in the one or more cellular wireless service providers to which the UE is restricted to access.

* * * * *